(12) United States Patent
Jeon et al.

(10) Patent No.: US 9,372,617 B2
(45) Date of Patent: Jun. 21, 2016

(54) OBJECT CONTROL METHOD AND APPARATUS OF USER DEVICE

(71) Applicant: Samsung Electronics Co., Ltd., Gyeonggi-do (KR)

(72) Inventors: Jinyoung Jeon, Seoul (KR); Jiyoung Kang, Gyeonggi-do (KR); Daesung Kim, Seoul (KR); Jinyong Kim, Gyeonggi-do (KR); Boyoung Lee, Seoul (KR); Seungkyung Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 114 days.

(21) Appl. No.: 14/211,982

(22) Filed: Mar. 14, 2014

(65) Prior Publication Data

US 2014/0282070 A1 Sep. 18, 2014

(30) Foreign Application Priority Data

Mar. 14, 2013 (KR) ........................ 10-2013-0027600

(51) Int. Cl.
*G06F 3/00* (2006.01)
*G06F 3/0488* (2013.01)
*G06F 3/01* (2006.01)
*G06F 3/03* (2006.01)
*G06F 3/0484* (2013.01)
*G06F 3/044* (2006.01)
*H04M 1/725* (2006.01)

(52) U.S. Cl.
CPC .............. *G06F 3/0488* (2013.01); *G06F 3/017* (2013.01); *G06F 3/0304* (2013.01); *G06F 3/044* (2013.01); *G06F 3/04842* (2013.01); *G06F 3/04883* (2013.01); *G06F 2203/04108* (2013.01); *G06F 2203/04808* (2013.01); *H04M 1/7253* (2013.01)

(58) Field of Classification Search
CPC ............................... G06F 3/017; G06F 3/0486
See application file for complete search history.

(56) References Cited

U.S. PATENT DOCUMENTS

| 8,581,856 B2* | 11/2013 | Benko ..................... G06F 3/005 178/18.01 |
|---|---|---|
| 2010/0071965 A1 | 3/2010 | Hu et al. |
| 2010/0090971 A1 | 4/2010 | Choi et al. |
| 2011/0088002 A1 | 4/2011 | Freer |
| 2011/0316790 A1 | 12/2011 | Ollila et al. |
| 2014/0136986 A1* | 5/2014 | Martin .................. G06F 3/0488 715/748 |

FOREIGN PATENT DOCUMENTS

KR 1020100041107 4/2010
WO WO 2010/098050 9/2010

OTHER PUBLICATIONS

Hiroshi Sasaki et al., "Hand-Menu System: A Deviceless Virtual Input Interface for Wearable Computers", Journal of Control Engineering and Applied Informatics, Jan. 1, 2006.
Kazuhiro Terajima et al., "Fast Finger Tracking System for In-air Typing Interface", CHI 2009-Spotlight on Works in Progress—Session 1, Apr. 4-9, 2009.
European Search Report dated Dec. 19, 2014 issued in counterpart application No. 14159931.6-1959.

* cited by examiner

*Primary Examiner* — Omar Abdul-Ali
(74) *Attorney, Agent, or Firm* — The Farrell Law Firm, P.C.

(57) ABSTRACT

An object control method and apparatus of the user device using hovering gestures are provided. The object control method includes displaying at least one object on a display screen, detecting a multi-finger hovering gesture for selecting the object on the display screen, activating a camera upon detection of the multi-finger hovering gesture, recognizing a hand in a picture input through the camera, and entering, when the hand disappears out of a viewing angle of the camera, a file transfer standby state for transmitting the selected object.

25 Claims, 9 Drawing Sheets

FIG. 4
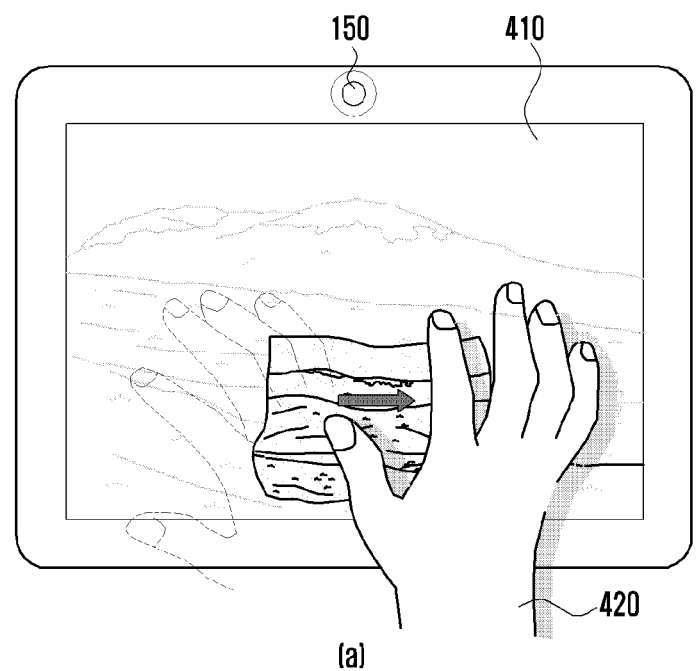
(a)
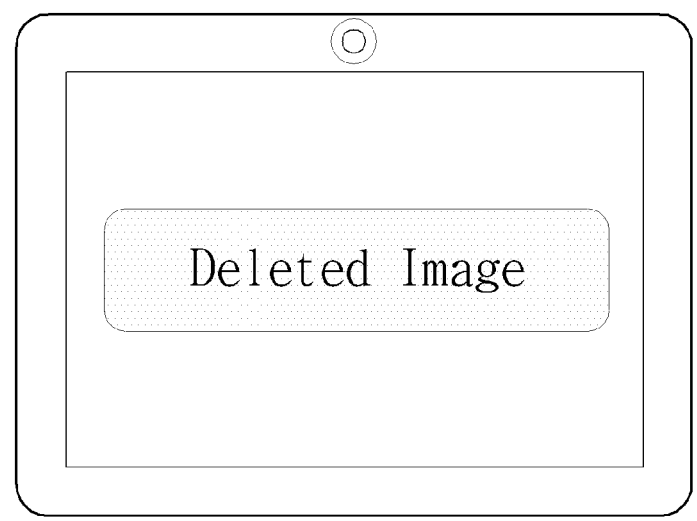
(b)

FIG. 5
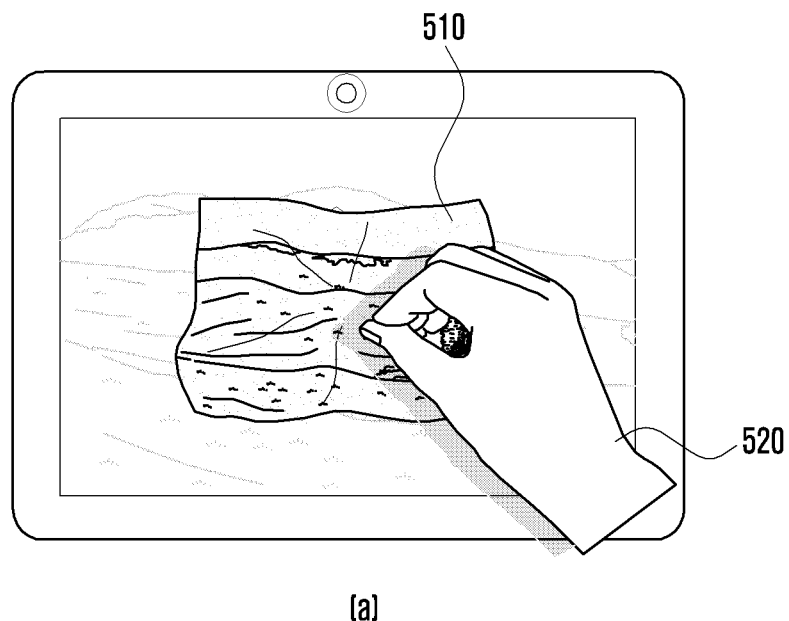
(a)
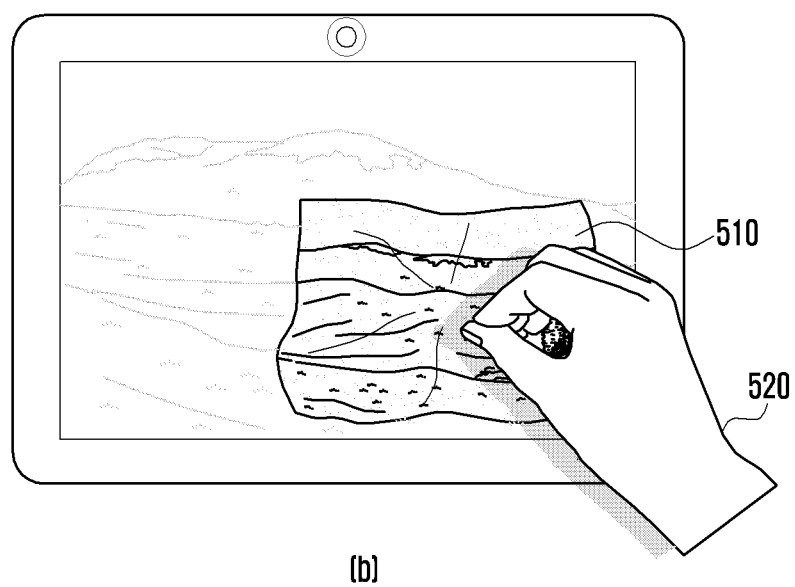
(b)

OBJECT CONTROL METHOD AND APPARATUS OF USER DEVICE

PRIORITY

This application claims priority under 35 U.S.C. §119(a) to a Korean Patent Application filed in the Korean Intellectual Property Office on Mar. 14, 2013 and assigned Serial No. 10-2013-0027600, the entire disclosure of which is incorporated herein by reference.

BACKGROUND OF THE INVENTION

1. Field of the Invention

The present invention relates generally to an object control method and apparatus of a user device, and more particularly, to an object control method and apparatus of the user device using hovering gestures.

2. Description of the Related Art

With the wide use of mobile devices such as smartphones, tablet Personal Computers (PC), and laptop PCs, touchscreen-enabled user devices are continuously being developed. A touchscreen-enabled device allows the user to control the functions through the display and enter information with various interactions such as by touch gesture, speech, and motion.

Because the functionality of the mobile device becomes complex, various user interactions are required to execute a certain function. Typically, through a User Interface (UI) provided on the screen of the user device, the user needs to perform a series of actions according to the design principle of the device to execute a certain function. For example, in order to transfer certain content to another device, it is necessary to make an input to establish a connection between the devices, an input to select the content, an input to enter a transfer menu, and an input to request for transmission in series. Such user actions lack intuitiveness and thus the device function is difficult to operate especially for those who are not familiar with the device. Accordingly, there are many studies in progress in order for the user to manipulate the user device with intuitive gestures.

SUMMARY OF THE INVENTION

The present invention has been made to address at least the problems and disadvantages described above and to provide at least the advantages described below.

Accordingly, an aspect of the present invention is to provide an object control method and apparatus of a user device that is capable of manipulating functions of the user device with intuitive gestures.

Another aspect of the present invention is to provide an object control method and apparatus of a user device that is capable of executing a certain function of the user device, such as file transfer and file delete functions, with an intuitive gesture.

In accordance with an aspect of the present disclosure, an object control method of a terminal is provided. The method includes displaying at least one object on a display screen; detecting a multi-finger hovering gesture for selecting the object on the display screen; activating a camera upon detection of the multi-finger hovering gesture; recognizing a hand in a picture input through the camera, and entering, when the hand disappears out of a viewing angle of the camera, a file transfer standby state for transmitting the selected object.

In accordance with another aspect of the present disclosure, a terminal is provided. The terminal includes a radio communication unit which transmits and receives radio signals, a display unit which displays at least one object; a sensing unit which senses a user gesture to the object; a camera unit which takes an image of the user gesture; and a control unit which controls the sensing unit to detect a multi-finger hovering gesture for selecting the object on the display screen, activates the camera unit upon detection of the multi-finger hovering gesture, recognizes a hand in the image input through the camera unit, and controls the terminal to enter, when the hand disappears out of a viewing angle of the camera unit, a file transfer standby state for transmitting the selected object.

BRIEF DESCRIPTION OF THE DRAWINGS

The above and other aspects, features, and advantages of certain embodiments of the present invention will be more apparent from the following detailed description in conjunction with the accompanying drawings, in which:

FIG. 4 illustrates the user interaction for deleting an object in the object control method according to an embodiment of the present invention;

FIG. 5 illustrates a visual feedback effect in correspondence to the grab gesture in the object control method according to an embodiment of the present invention;

DETAILED DESCRIPTION OF EMBODIMENTS OF THE PRESENT INVENTION

Figure 1:
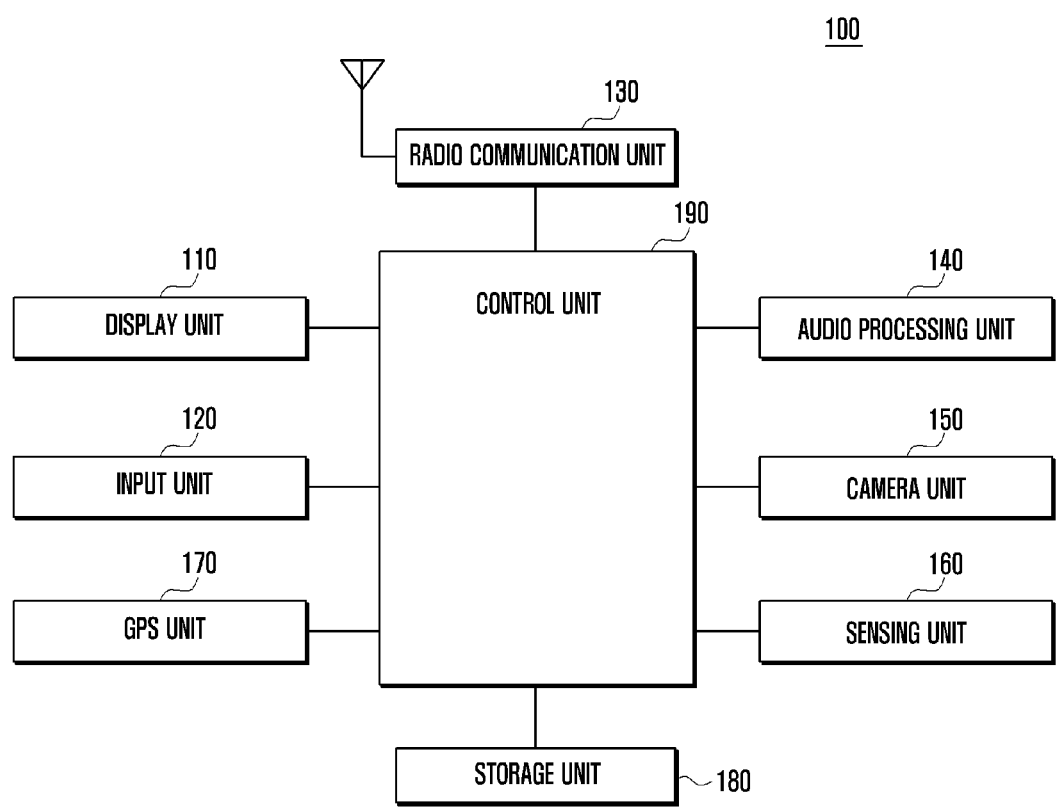
FIG. 1 is a block diagram illustrating a configuration of the mobile terminal according to an embodiment of the present invention.

Various embodiments of the present invention are described with reference to the accompanying drawings in detail. The terms and words used in this description and the appended claims are not to be interpreted in common or lexical meaning, but are to be interpreted in the meaning and concept conforming to the technical concept of the present invention. Thus, it should be understood that there may be various equivalents and modified examples that can replace the embodiments described in the present specification and the configuration shown in the drawings at the time of filing the present application. In the drawings, certain elements may be exaggerated or omitted or schematically depicted for clarity of the invention, and the actual sizes of the elements are not reflected. Thus, the present invention is not limited in the relative sizes of the elements and distances therebetween.

In the following description, the user device is capable of detecting a user input gesture, e.g. touch and hovering, which is determined based on the distance between the touchscreen and a touch input tool. The user device is also capable of detecting a single input having one input factor and multi-inputs having at least two input factors.

In the following description, the term 'hovering' denotes an input gesture made with the touch input tool within a predetermined distance range from the touchscreen. For example, a hovering gesture may be made with the touch input tool in the range where the user device is capable of recognizing the touch input tool to generate an input signal.

In the following description, the term 'gesture' denotes a user action for making an input, and the gesture can be classified into one of a multi-hovering gesture and a hand gesture. Here, the multi-hovering gesture denotes the user action recognized as the hovering and transferred to the touchscreen and may correspond to a hovering-based finger gesture. The hand gesture denotes the hand motion recognized as an image input through a camera and may correspond to a camera-assisted gesture.

The object control method and apparatus of the present invention may be applied to a mobile terminal. The mobile terminal may be any of a mobile phone, a smartphone, a tablet PC, a hand-held PC, a Portable Multimedia Player (PMP), a Personal Digital Assistant (PDA), etc. In the following, the description is directed to the object control method and apparatus of the present invention being applied to a mobile terminal.

FIG. 1 is a block diagram illustrating a configuration of the mobile terminal according to an embodiment of the present invention.

Referring to FIG. 1, the terminal 100 according to an embodiment of the present invention includes a display unit 110, an input unit 120, a radio communication unit 130, an audio processing unit 140, a camera unit 150, a sensing unit 160, a Global Positioning System (GPS) reception unit 170, a storage unit 180, and a control unit 190.

The display unit 110 displays various screens associated with the functions of the terminal 100. The display unit 110 converts the video data input from the control unit 190 to an analog signal for displaying on the screen under the control of the control unit 190. The display unit 110 may display the screens associated with the operation of the terminal such as lock screen, home screen, application (or app) execution screen, menu screen, keypad screen, message composition screen, and Internet screen.

The display unit 110 processes the object presented on the screen with distinct graphics according to the user's multi-hovering gesture. For example, if a multi-hovering-based grab gesture is detected, the display unit may display the screen or the object with a graphical effect in which the size of the screen or the object shrinks. In this case, the graphical effect may express the shrink or enlargement of the display size of the object according to the distance between the user's hand and the screen. If a multi-hovering-based release gesture is detected, a graphical effect impacts the size of the object to be increased on the screen of the display unit 110. In this case, the object displayed on the screen of the display unit 110 may be an object file received from another terminal. The display unit 110 may also provide a graphical effect enlarging the size of the screen gradually according to the data amount received from the other terminal.

The display unit 110 may be implemented with one of a Liquid Crystal Display (LCD), Organic Light Emitting Diodes (OLED), Active Matrix OLED (AMOLED), a flexible display, and a transparent display.

The display unit 110 may include a display panel for displaying various screens associated with the operations of the terminal and a touch panel covering a surface of the display panel to detect a touch gesture and generate corresponding input signal. For example, the touch panel is placed on the display panel. The touch panel may be implemented as an add-on type embodied on the front surface of the display unit 110 or an on-cell type or in-cell type embodied in the display unit 110. The touch panel may be one of a resistive type, capacitive type, and electromagnetic induction type. The display unit 110 may display the application execution information dynamically according to the rotation (or orientation) of the terminal 100 and support switching between landscape mode and portrait mode according to the change of orientation.

The input unit 120 generates various input signals in response to the user input. The input unit 110 may receive the input of numeral or alphabetic information and include a plurality of alphanumeric keys and function keys such as side keys, shortcut keys, and home key. The input unit 120 may generate a key signal associated with the user setting and function control to the control unit 190. When the touch panel is implemented as a full touchscreen, the input unit 120 may be provided as a virtual touchpad.

When a touch panel is included, the display unit 110 may work as a part of the input unit 120. In this case, the input signal for controlling the terminal may be generated by the touch panel. The touch panel may detect the touch gesture made by a touch input tool (e.g. user's hand and touch pen) and generates corresponding input signal. Particularly, where a capacitive type touch panel is used, the touch panel may detect the capacitance according to the distance between touch input tool and the screen and identify the user's gesture according to the capacitance value. The distance between the touch input tool and the screen may be measured by a distance measurement sensor, e.g. infrared sensor. The input unit 120 may generates an input signal in response to the user input gesture such as touch, multi-touch, signal hovering, and multi-hovering gesture.

The radio communication unit 130 is provided for the communication functions of the terminal. The radio communication unit 130 establishes a communication channel with the mobile communication network for communication such as voice communication, video conference, and data communication. The radio communication unit 130 may include a Radio Frequency (RF) receiver for low noise amplifying and down-converting the received signal. The radio communication unit 130 may include a cellular communication module (e.g. a 3rd Generation cellular communication module, a 3.5th Generation cellular communication module, and a 4th Generation cellular communication module), a digital broadcast module (e.g. DMB module), and a short range communication module. Here, the short range communication module may include at least one of a Wi-Fi module, a Bluetooth module, and a Wi-Fi direct module. The short range communication module may establish a communication channel with another terminal to exchange certain file or data under the control of the control unit 190.

The terminal 100 may support an Access Point (AP) mode. In the AP mode, the terminal 100 may exchange data with a device which attaches the terminal 100 as AP. When the terminal 100 connects to a certain AP for communication with another terminal connected to the AP, it is possible to exchange files through the AP.

The audio processing unit 140 may include a speaker (SPK) for outputting audio signal generated or decoded in the terminal 100 and a microphone (MIC) for receiving audio signal for supporting voice communication and video conference and recoding function. The audio processing unit 140 performs Digital to Analog (DA) conversion on the audio data including voice to generate an analog signal to the speaker (SPK), and performs Analog to Digital (AD) conversion on the audio data including voice input through the microphone (MIC) to generate the digital signal to the control unit 160. The audio processing unit 150 may be provided with a codec (coder/decoder), which may include a data codec for processing packet data and an audio codec for processing audio signals including voice. The audio processing unit 150 converts the analog audio signal input through the microphone to the digital audio signal using the audio codec, and the digital audio signal is transferred to the control unit 190.

The camera unit 150 is provided for shooting pictures. The camera unit 150 includes a camera sensor for converting light into electrical signals, an Image Signal Processor for converting an analog view signal taken by the camera sensor to digital data, and a Digital Signal Processor (DSP) for processing the digital data output by the Image Signal Processor (e.g. scaling, noise canceling, RCG signal conversion, etc.) to generate a video signal fit for the touchscreen. Here, the camera sensor may be any of a Charge-Coupled Device (CCD) and a Complementary Metal-Oxide Semiconductor (CCD) sensor.

The camera unit 150 may be provided with a sensor function for recognizing a user's gesture. The camera unit 150 may operate multiple functions under the control of the control unit 190. For example, the camera unit 150 may transfer the image input through the lens to the control unit 190 when a predetermined application is running under the control of the control unit 190.

The sensing unit 160 detects the user input gesture and environmental change around the user device 100 and generates corresponding information which will be sent to the control unit 190. The sensing unit 160 may include at least one of a touch sensor capable of detecting a touch gesture, a proximity sensor for detecting approach of a touch input tool, a distance measurement sensor for measuring distance between the touch input tool and the device, an image sensor for collecting video image, a motion recognition sensor for recognizing motion and action in 3-dimensional space, an orientation sensor for detecting an orientation, and an acceleration sensor for detecting movement speed.

The GPS unit 170 receives GPS signals from the GPS satellites under the control of the control unit 190. The GPS unit 170 connects to the GPS satellite to receive the GPS signals. The GPS unit 170 transfers the received GPS signal to the control unit 170. The control unit 190 calculates the current location of the mobile terminal based on the GPS signals.

The GPS unit 170 may be used for establishing a connection with another terminal. For example, if a multi-hovering gesture is detected, the control unit 190 may send the GPS information of the user device to a GPS server through the GPS unit 170. If GPS coordinates information of another terminal is received from the GPS server within a predetermined time, the control unit 190 may receive a file from the corresponding server.

The storage unit 180 stores the Operating System (OS) of the terminal 100 and various applications (or apps) and data generated in the terminal 100. The data may include all types of data such as the application data associated with the operation of the application and data received from outside (e.g. external server, another mobile terminal, and personal computer). The storage unit 180 may store user interfaces provided by the terminal and various settings associated with functions of the terminal 100.

The storage unit 180 may store a gesture recognition program for recognizing the gesture made by the user. The gesture recognition program recognizes the hovering-based multi-hovering gesture and camera-assisted gesture. The gesture recognition program is capable of extracting a hand area from the picture input through the camera unit 150 and recognizing the shape of the hand. If the user's hand changes in shape and its action in the picture changes, the gesture recognition program discerns the action and the gesture matching the action.

The storage unit 180 may store information on various hand gestures that can be made by a hand, e.g. finger arrangements, finger positions, a hand behavior, and a hand shape. The storage unit 180 also may store predetermined commands corresponding to the user's gestures. The commands corresponding to the user's gestures may be set during manufacturing and reset by the user.

The control unit 190 controls the overall operations of the terminal and signal flows among the internal components of the terminal and processes data. The control unit 190 controls the power supply from the battery to the internal components. If the terminal powers on, the control unit 190 controls the booting process of the terminal and executes application programs of the terminal according to the user configuration.

The control unit 190 receives the input signal form the touchscreen and discerns the user's gesture based on the input signal. The control unit 190 detects the approach of the touch input and calculates the distance between the touch input tool and the touchscreen. Here, the touch input tool may be a touch pen or the user's hand and, in the following descriptions, it is assumed that the touch input tool is the user's hand.

If the distance between the touch input tool and the touchscreen is within a predetermined range, the control unit 190 detects a hovering gesture. The control unit 190 may discriminate between a single hovering gesture and a multi-hovering gesture. The single hovering gesture has a single hovering factor made by the touch input tool. The multi-hovering gesture has at least two hovering factors made by the touch input.

The control unit 190 calculates a change of the hovering area based on the location information of the multi-hovering areas and determines the multi-hovering gesture of the user based on the change of the hovering area. Here, the location information may include coordinates of the hovering areas. For example, the control unit 190 may calculate the center points of the initial hovering areas of the multi-hovering gesture and, if the distance between the center points decreases, determine that a hovering-based grab gesture is made. Otherwise, if the distance between the center points increases, the control unit 190 determines that a hovering-based release gesture is made. The control unit 190 also may extract the hand area from the picture input through the camera unit 150 using a gesture recognition program and calculate a shape of the hand based on the hand area. If the hand shape changes, the control unit 190 may perform a pattern match process to determine the camera-assisted gesture.

If the user's gesture, e.g. multi-hovering gesture or hand gesture, is detected, the control unit 190 executes a function corresponding to the gesture or a predetermined command matching the gesture and displays an execution screen on the display unit 110.

Figure 2:
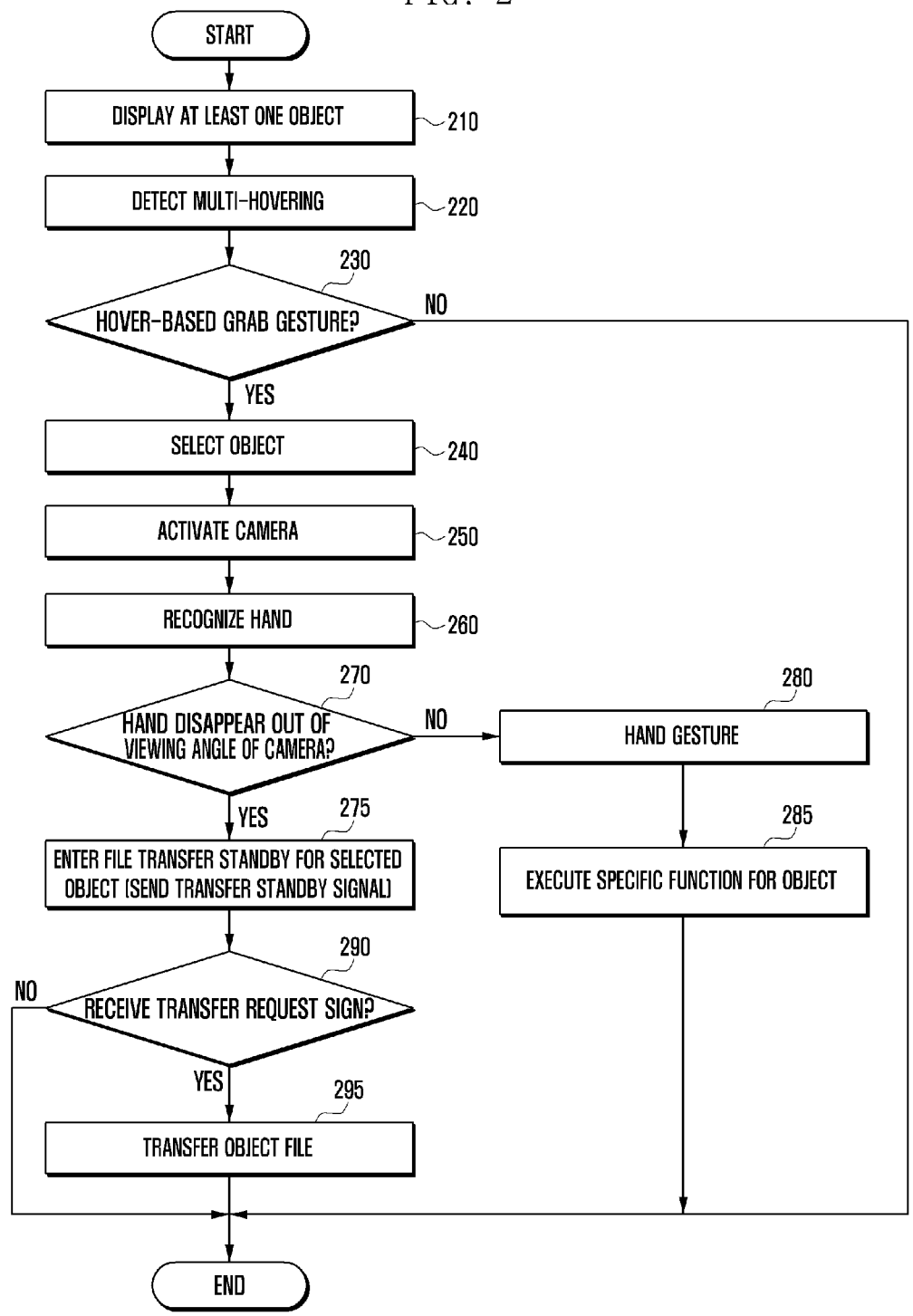
FIG. 2 is a flowchart illustrating an object control method of the terminal according to an embodiment of the present invention.

FIG. 2 is a flowchart illustrating an object control method of the terminal according to an embodiment of the present invention.

Referring to FIG. 2, the terminal 100 displays at least one object on the screen of the display unit according to a user input or a predetermined schedule in step 210. Here, the object denotes the object presented on the screen to represent digitalized information provided by the terminal. The object may be any of icons and thumbnail images presented on the screen of the display unit 110. The object represents a data file, e.g. text file, speech file, video file, picture file, and URL information file.

In this case, the terminal 100 may be operated in a hovering recognition mode. The hovering recognition mode may be activated when a certain application supporting the hovering recognition function is running or the hovering function is executed. The hovering recognition function is capable of recognizing a hovering gesture made when certain content is displayed in a full screen mode or a plurality of objects are selected by the user, but is not limited thereto.

The terminal 100 detects a multi-hovering gesture in a predetermined distance range at step 220. For example, the terminal 100 measures the capacitance varying according to the approach of a part of the human body, e.g. the user's hand. The terminal 100 may detect the variation of the capacitance at two or more areas. The terminal 100 calculates the distance between the user's hand and the screen based on the capacitance variation. If the distance between the user's hand and the screen decreases into a predetermined range (e.g. 3 cm), the terminal 100 determines the occurrence of a hovering gesture. If a hovering gesture is detected, the terminal 100 may check the position of the hovering gesture.

If the hovering gesture is detected in at least two areas, the terminal 100 determines that the hovering gesture is a multi-hovering gesture. That is, if a plurality of input tools (e.g. plural fingers) are detected in a predetermined distance range at corresponding positions, the terminal 100 may recognize the hovering factors detected at two or more areas as valid data.

The terminal 100 determines whether the multi-hovering gesture made in a predetermined time is a grab gesture at step 230. The terminal 100 determines the hovering direction, distance, and speed of the user's gesture based on the respective initial hovering areas.

In detail, the terminal 100 calculates the position vector using the movement direction and distance of the multi-hovering and determines whether the grab gesture has occurred based on the calculated position vector. The terminal 100 determines the center points of the hovering areas and, if the distance between the center points decreases, determines that the grab gesture has been made. The control unit 190 also may determine an outline including the two or more hovering areas and, if the outlined area decreases in size, determines that the grab gesture has been made.

If the hovering-based grab gesture is detected, the terminal 100 determines the object displayed on the screen as a selected object for executing a specific function at step 240. Although the terminal 100 may determine one object displayed on the display unit 110, it is possible to maintain the selected state of the objects selected already by the user input.

The terminal 100 may output a visual feedback effect for the object selected by the grab gesture. For example, the terminal 100 may provide a visual effect as if the user grabs and lifts a physical object in correspondence with the grab gesture.

If the object is selected, the terminal 100 activates the camera unit 150 at step 250. Here, the camera unit 150 may be a front camera mounted on the front side of the terminal 100. The camera 150 works as a sensor for recognizing the user's hand and operates in the background.

The terminal 100 recognizes the user's hand in the image input through the camera unit 150 at step 260. For example, the terminal 100 checks the background based on the color information in the image input through the camera unit 150 to separate the hand area. The terminal 100 extracts the feature points of a hand from the hand area and calculates the contour of the hand. The terminal may recognize the shape and action of the hand using the contour of the hand. The terminal 100 performs pattern matching based on the shape and the action of the hand to detect the hand gesture.

The terminal 100 determines whether the user's hand has disappeared out of the viewing angle of the camera unit 150 at step 270. If it is impossible to separate the hand area from the image based on the color information, the terminal 100 determines that the user's hand has disappeared out of the viewing angle of the camera unit 150.

If it is determined that the user's hand has disappeared out of the viewing angle of the camera unit 150, the terminal 100 controls the selected object to enter a file transfer standby state at step 275. The terminal 100 establishes a communication channel with another terminal to send a transfer standby signal and, if the communication channel has been established, sends the transfer standby signal thereon. A detailed description on the file transfer standby state is made with reference to FIG. 6.

The terminal 100 determines whether a transfer request signal is received from a second terminal at step 290. The transfer request signal may be the response signal transmitted by the second terminal. If the transfer request signal is received, the terminal 100 transfers the file or data represented by the selected object to the second terminal which has transmitted the transfer request signal at step 295.

If it is determined that the user's hand has not disappeared out of the viewing angle of the camera unit 150, the terminal 100 may detect a camera-assisted hand gesture at step 280. For example, the user may make a gesture of drawing when a specific object has been selected within the viewing angle of the camera unit 150. The terminal 100 may check the contour of the user's hand from the image input through the camera unit 150 and determine the drawing action made by the user's hand through the pattern matching algorithm.

If the hand gesture is detected, the terminal 100 executes the function corresponding to the hand gesture in association with the selected object at step 285. For example, if an object deletion command is defined in association with the drawing action, the terminal 100 executes the object deletion command in response to the drawing gesture.

Figure 3:
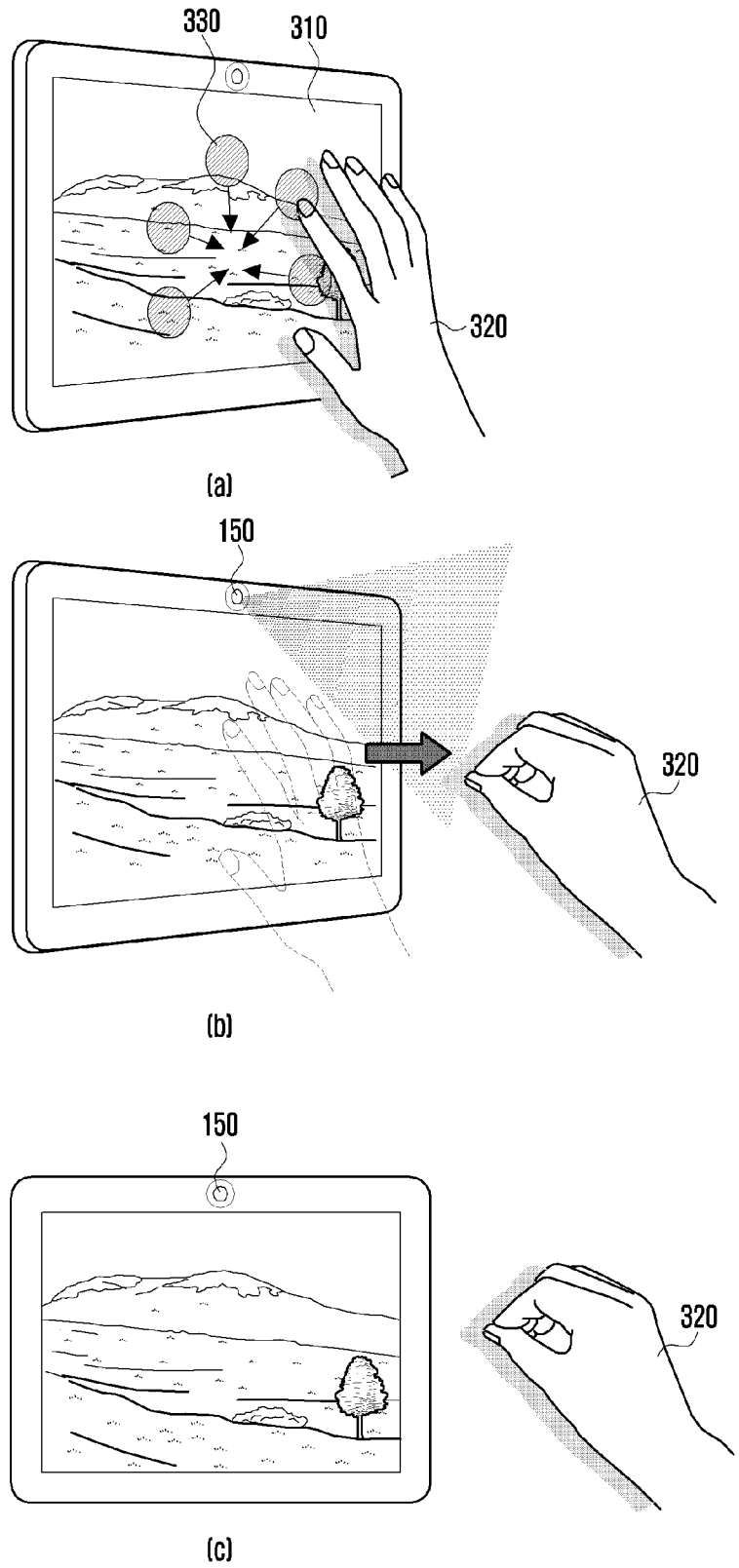
FIG. 3 illustrates the user interaction for transferring an object in the object control method according to an embodiment of the present invention.

FIG. 3 illustrates the user interaction for transferring an object in the object control method according to an embodiment of the present invention.

Referring to FIG. 3, the display unit 110 may display at least one object on the screen according to a user's request or a predetermined schedule. The display unit 110 may display a certain object in a full screen mode or a plurality of objects on the screen.

For example, the user may execute a gallery function provided by the terminal. The terminal may display a certain picture 310 in the full screen mode as illustrated in FIG. 3(a). The terminal also may display a list of pictures and presents a picture selected from the list on the screen.

The user may have a hand 320 approach the screen to make a gesture for executing a function to a specific picture displayed on the screen. Here, the terminal 100 may configure a predetermined distance between the screen and the touch input tool for discriminating between the hovering and touch gestures. The predetermined distance may be a threshold to detect the position of the touch input tool.

If the user's hand 320 approaches the screen to the predetermined distance range, the terminal 100 may detect two or more hovering areas 330 corresponding to the fingers. The terminal 100 may detect the fingers approaching and extract the four hovering areas 330 as illustrated in FIG. 3(a). In this case, although five fingers approach the screen to the predetermined distance range, the terminal may not detect all of the five fingers due to different lengths of the fingers.

The user may make a gesture as if grabbing a certain physical object. Then the terminal 100 checks the movement of the hovering areas to a center point and detects the hovering-based grab gesture. The terminal selects the object, i.e. the picture, displayed on the screen in response to the grab gesture.

The terminal activates the camera unit 150 to take a picture as illustrated in FIG. 3(*b*). The terminal 100 acquires a picture input through the camera unit 150, separates the hand area from the picture, and recognizes the shape and contour of the hand. The terminal may determine the disappearance of the user's hand out of the viewing angle of the camera 150 depending on whether the hand area is extracted or not from the picture input through the camera unit 150.

The user may move the hand 320 out of the viewing angle of the camera unit 150 as illustrated in FIG. 3(*c*). Then the control unit determines the disappearance of the user's hand 320 out of the viewing angle of the camera unit 150 and enters the file transfer standby state preparing for transferring the selected picture. In this case, the terminal may have the communication channel established already with a second terminal. In the file transfer standby state, the terminal may sends a second terminal a file transfer standby signal.

FIG. 4 illustrates a user interaction for deleting an object in the object control method according to an embodiment of the present invention.

Referring to FIG. 4, the user may execute a gallery function provided by the terminal and display a certain picture 410 in a full screen mode. If a multi-hovering gesture, e.g. grab gesture, for selecting the picture 410 is detected, the terminal activates the camera unit 150.

The user may make a gesture with a hand 420 within the viewing angle of the camera 150, e.g. throwing gesture as illustrated in FIG. 4(*a*). The terminal separates the hand area from the picture input through the camera unit 150 and recognizes the motion and shape of the hand.

If it is determined that the user's hand motion is the throwing motion through the pattern matching process, the terminal may delete the picture selected with the grab gesture as illustrated in FIG. 4(*b*).

FIG. 5 illustrates a visual feedback effect in correspondence to the grab gesture in the object control method according to an embodiment of the present invention.

Referring to FIG. 5, the user may make a gesture to select certain content as if grabbing a physical object on the terminal with his/her fingers. Then the terminal detects the user's gesture as the hovering-based grab gesture and selects the content 510 displayed on the screen of the display unit.

The terminal may provide the user with a visual feedback corresponding to the selection of the object. The terminal may reduce the size of the displayed content 510. If the distance between the user's hand 520 and the screen changes, the terminal may increase or decrease the size of the content 510 processed graphically according to the change of the distance. For example, the terminal may provide a visual feedback effect as if the user grabs and lifts a physical object on the touchscreen. Accordingly, the user may experience the visual effect as if the content is grabbed and lifted in the real world like a physical object.

If the user moves the hand in the above state, the terminal moves the graphically processed content 510 in the movement direction of the user's hand 520 as illustrated in FIG. 5(*b*).

Figure 6:
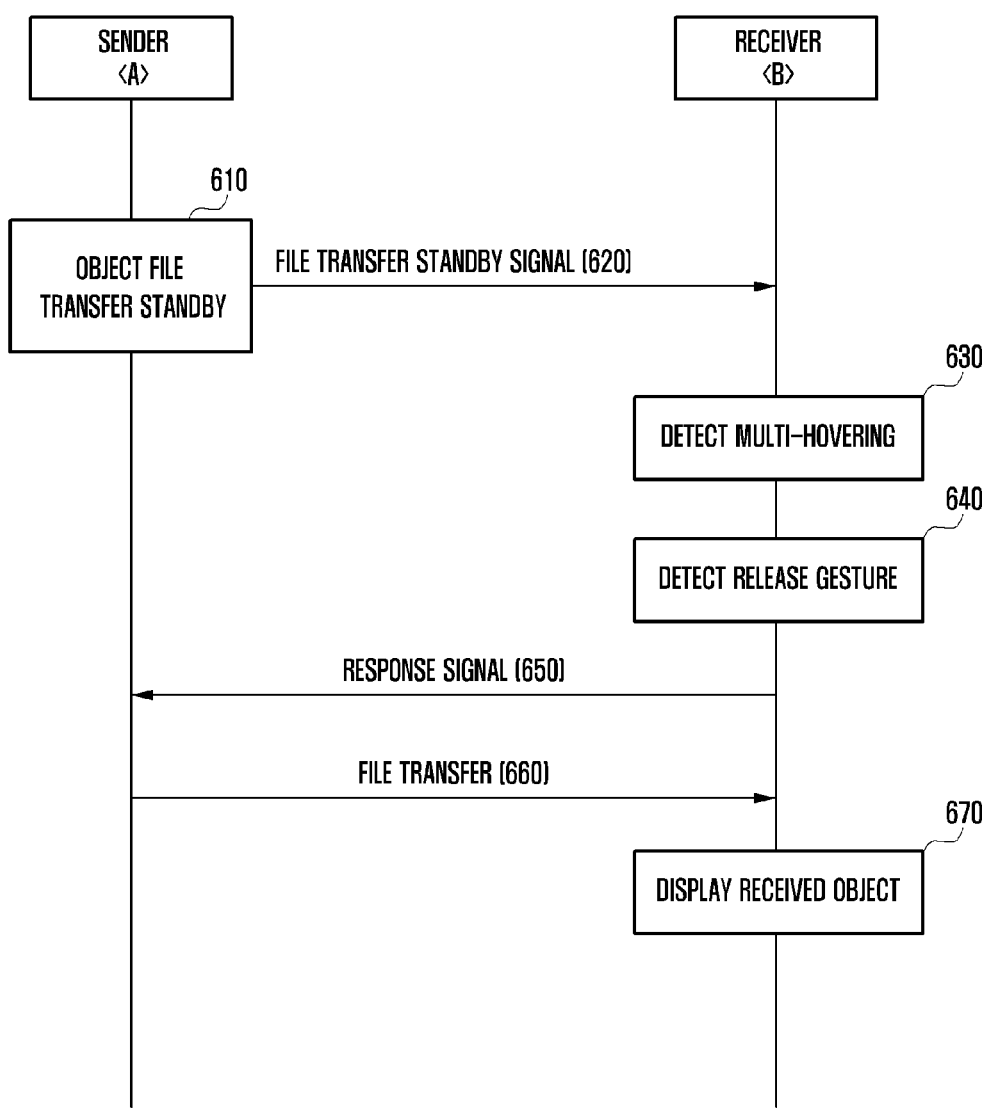
FIG. 6 is a signal flow diagram illustrating a file transfer procedure of the object control method according to an embodiment of the present invention.

FIG. 6 is a signal flow diagram illustrating a file transfer procedure of the object control method according to an embodiment of the present invention.

Referring to FIG. 6, the file transfer procedure is described from the view points of the sender terminal A and the receiver terminal B separately. The terminal may operate as both the sender terminal A and the receiver terminal B. It is assumed that the sender terminal A and the receiver terminal B are connected through a communication channel, e.g. a paired channel, a Wi-Fi direct channel, and a Bluetooth channel.

If specific content is selected at the sender terminal A and then the user's hand disappears out of the viewing angle of the camera, the sender terminal A enters the file transfer standby state for transferring the selected content at step 610. The sender terminal A determines whether there is any terminal with which a communication channel has been established and, if there is, sends the receiver terminal B a file transfer standby signal at step 620. The receiver terminal B may output file transfer standby alarm information (e.g. transfer standby message) on the display unit upon receiving the transfer standby signal, but is not limited thereto.

The receiver terminal B then receives the file transfer standby request signal from the sender terminal A, detects a multi-hovering at step 630, and determines the release gesture based on the motion of the multi-hovering at step 640. In detail, if a distance of two hovering areas increases, the receiver terminal B determines that the release gesture has been made. The receiver terminal B also may determine an outer line including the two or more hovering areas and, if the hovering areas move out of the outer line, determines that the release gesture has been made.

If the release gesture is detected, the receiver terminal B sends a response signal to the sender terminal A in response to the file transfer standby signal at step 650. Upon receiving the response signal, the sender terminal A starts transmitting the selected object file to the receiver terminal B at step 660. The receiver terminal B may receive the object information transmitted by the sender device A at step 670.

Figure 7:
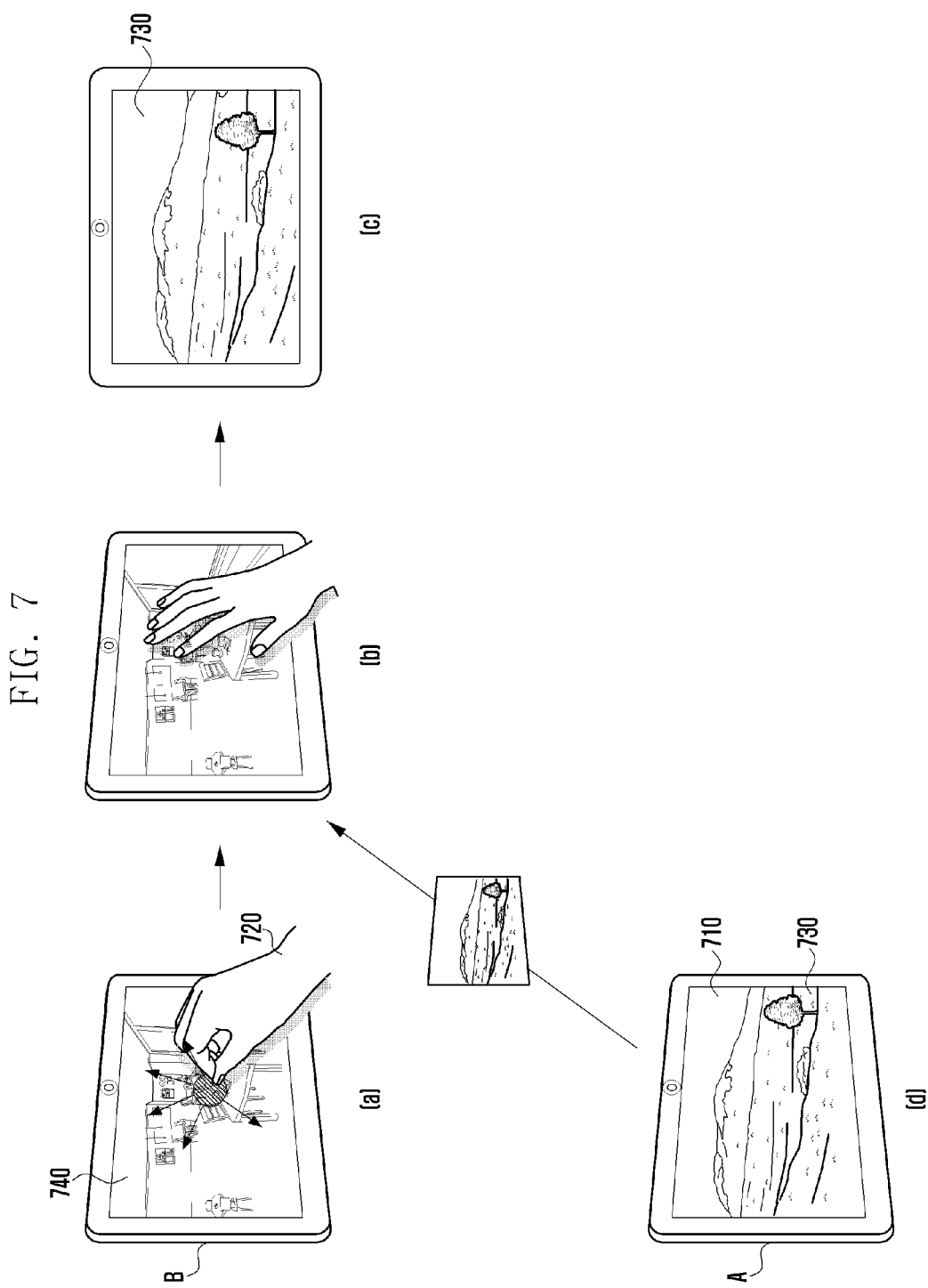
FIG. 7 illustrates an object transfer procedure in the object control method according to an embodiment of the present invention.

FIG. 7 illustrates an object transfer procedure in the object control method according to an embodiment of the present invention.

Referring to FIG. 7, when a communication channel has been established between the sender terminal A and the receiver terminal B, the user may take an interaction for file transfer by making a hand gesture of grabbing in the hovering state as illustrated in FIG. 3 and then moves the hand out of the viewing angle of the camera on the sender terminal A.

Then the sender terminal A selects the picture 710 displayed on the display unit as an object to be transferred and enters the file transfer standby mode. At this time, the sender terminal A sends to the second terminal, i.e. the receiver terminal B, a file transfer standby signal to notify the existence of the content to be transmitted. In this case, the receiver terminal B is aware of the existence of the content to be received based on the file transfer standby signal.

The user may make a gesture as if releasing an object from a distance within a predetermined range on the receiver terminal B without touch. The receiver terminal B detects the approach of the fingers and detects two or more hovering areas and, if the hovering areas move away from each other, determines that a release gesture has been made.

If the release gesture is detected, the receiver device B sends a response signal to the sender terminal A in response to the file transfer standby signal. The sender terminal A then transmits the selected picture to the receiver terminal B. The receiver terminal B may display the picture 730 after receiving the picture 730 as illustrated in FIG. 7(*b*).

The file transfer between the terminals may be performed through one of Bluetooth communication, Wi-Fi direct communication, GPS UNIT and server communication, and AP-based communication.

Figure 8:
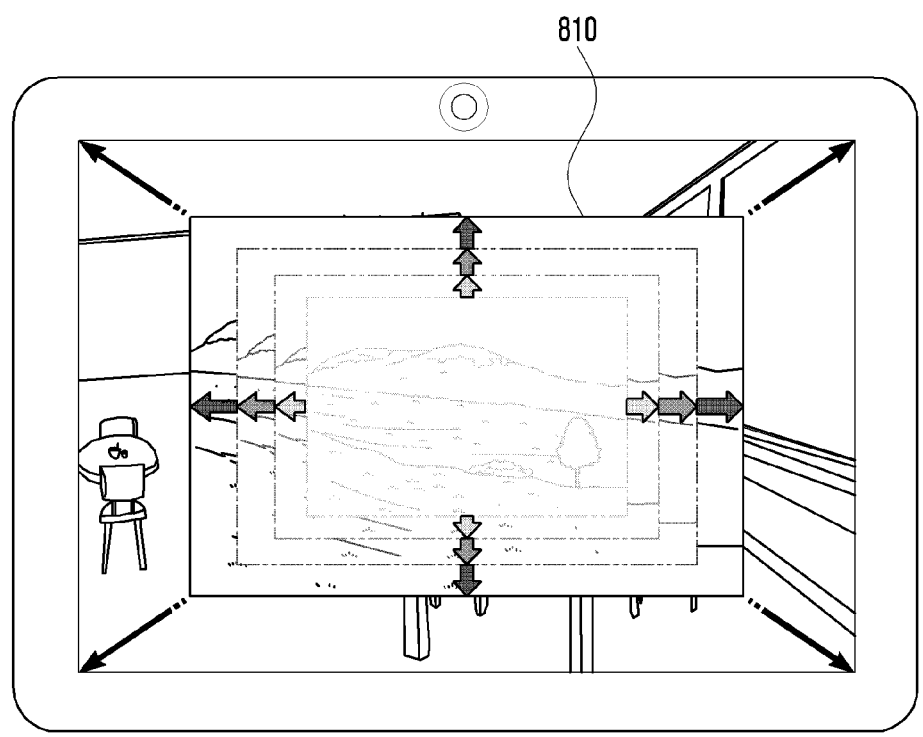
FIG. 8 illustrates a visual feedback in receiving a file in the object control method according to an embodiment of the present invention.

FIG. 8 is illustrates a visual feedback in receiving a file in the object control method according to an embodiment of the present invention.

Referring to FIG. 8, the terminal may receive a file or data corresponding to specific content from another terminal through a communication channel. If the file or data is received, the terminal provides a visual feedback effect expressing the object transfer state. For example, the terminal may show the graphical effect where the size of the received object increases on the screen according to the received data of the object. The user may check the progress or completion of the file transfer according to the size of the object displayed on the screen of the display unit.

Figure 9:
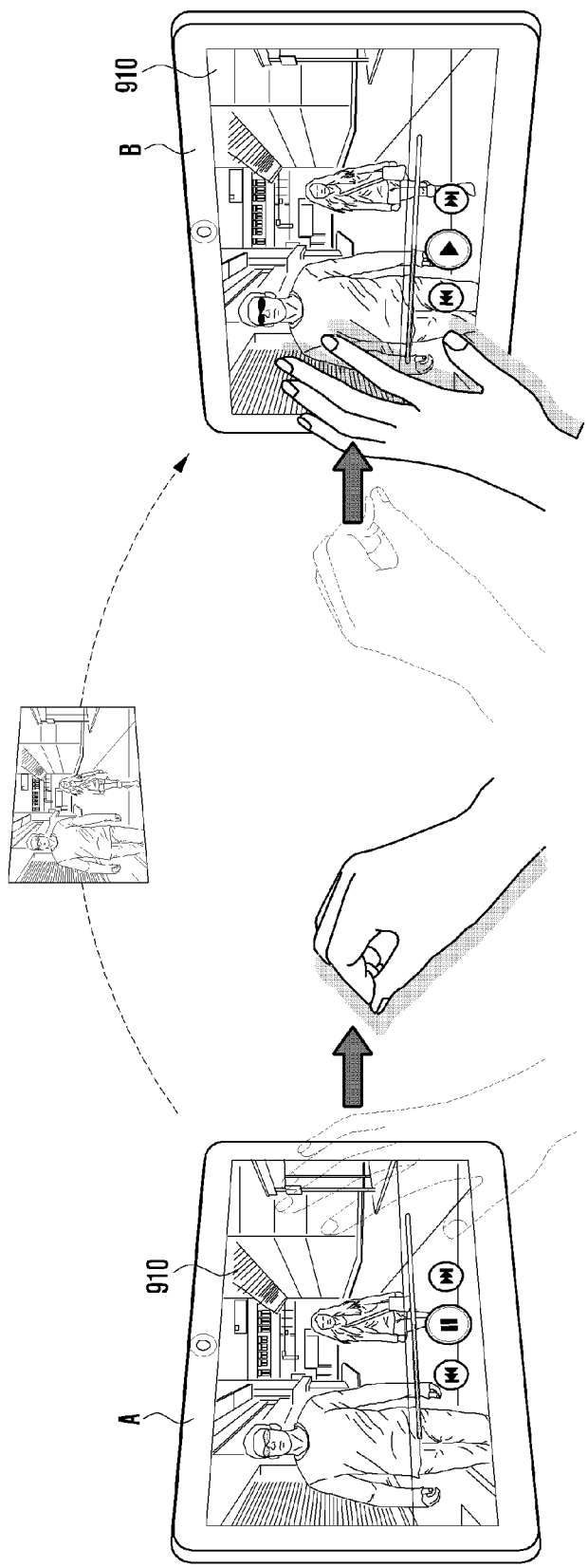
FIG. 9 is illustrates a motion picture file transfer procedure in the object control method according to an embodiment of the present invention.

FIG. 9 is illustrates a motion picture file transfer procedure in the object control method according to an embodiment of the present invention.

Referring to FIG. 9, suppose that the sender terminal A is playing a motion picture. If hovering-based grab gesture is detected in the motion picture playback mode, the sender terminal A enters the motion picture transfer standby state and sends a transfer standby signal to the receiver terminal B.

Afterward, if a hovering-based release gesture is detected at the receiver terminal B, the receiver terminal B sends a response signal to the sender terminal A in response to the transfer standby signal. Upon receiving the response signal, the sender terminal A transmits the motion picture currently being played to the receiver terminal B. The sender terminal A may transmits playback information as well as the motion picture content.

For example, when the sender terminal A transmits the currently playing motion picture content to the receiver terminal B, the receiver terminal B may play the motion picture from the time when the playback is paused at the sender terminal A.

The object control method and apparatus of the terminal according to the present invention are capable of allowing the user to manipulate content displayed on the screen intuitively. The object control method and apparatus of the present invention are capable of allowing the user to transfer content to another terminal or delete the contents with the same gestures used in the real world. The object control method and apparatus of the present invention are capable of providing user experience (UX) of prompt execution commands for executing a certain function of the terminal without use of the hierarchical menu structure.

Although the object control method of a terminal and apparatus of the present invention have been described using specific terms, the specification and drawings are to be regarded in an illustrative rather than a restrictive sense in order to help understand the present invention. It is obvious to those skilled in the art that various modifications and changes can be made thereto without departing from the spirit and scope of the invention.

What is claimed is:

1. An object control method of a terminal, the method comprising:
    displaying at least one object on a display screen;
    detecting a multi-finger hovering gesture for selecting the object on the display screen;
    activating a camera upon detection of the multi-finger hovering gesture;
    recognizing a hand in a picture input through the camera; and
    entering, when the hand disappears out of a viewing angle of the camera, a file transfer standby state for transmitting the selected object.

2. The method of claim 1, further comprising executing, when the hand makes a motion within the viewing angle of the camera, a predetermined function in association with the selected object according to the motion.

3. The method of claim 1, wherein detecting the multi-finger hovering gesture comprises:
    detecting at least two hovering areas on the display screen; and
    determining, when a distance between the two hovering areas decreases, that the multi-finger hovering gesture is made.

4. The method of claim 1, wherein the selected object changes in size.

5. The method of claim 4, wherein the selected object decreases or increases in size according to a distance between the display screen and the hand.

6. The method of claim 1, wherein displaying the at least one object comprises displaying the selected object in a full screen mode or a plurality of objects selected according to a user input.

7. The method of claim 1, further comprising:
    recognizing the hand of a user;
    acquiring an image of the hand input through the camera;
    separating a hand area from a background area based on color information of the image;
    recognizing a contour of the hand from the hand area; and
    recognizing motion and shape of the hand by performing pattern matching on the hand contour.

8. The method of claim 1, wherein entering the file transfer standby state comprises transitioning an operation mode of the terminal to a transfer standby mode.

9. The method of claim 8, wherein entering the file transfer standby state comprises:
    determining whether a second terminal is connected;
    transmitting, when the second terminal is connected, a transfer standby signal; and
    establishing, when the second terminal is not connected, a communication channel with the second terminal to transmit the transfer standby signal.

10. The method of claim 9, further comprising:
    receiving, after transmitting the transfer standby signal, a response signal from the second terminal; and
    transmitting the selected object to the second terminal upon receiving the response signal.

11. The method of claim 1, further comprising:
    detecting a multi-hovering gesture when connected with a second terminal in response to a file transfer request;
    transmitting a response signal to the second terminal in response to the multi-hovering gesture;
    receiving an object transmitted by the second terminal; and
    displaying the received object on the display screen.

12. The method of claim 11, wherein detecting the multi-hovering gesture comprises:
    detecting at least two hovering areas on the display screen; and
    determining, when a distance between the at least two hovering areas increases, that a multi-finger hovering gesture responding to the file transfer request is made.

13. The method of claim 11, wherein displaying the received object comprises displaying a visual feedback of increasing the object in size according to received data of the object.

14. A terminal comprising:
- a radio communication unit configured to transmit and receive radio signals;
- a display unit configured to display at least one object;
- a sensing unit configured to sense a user gesture to the object;
- a camera unit configured to take an image of the user gesture; and
- a control unit configured to control the sensing unit to detect a multi-finger hovering gesture for selecting the object on the display screen, activate the camera unit upon detection of the multi-finger hovering gesture, recognize a hand in the image input through the camera unit, and control the terminal to enter, when the hand disappears out of a viewing angle of the camera unit, a file transfer standby state for transmitting the selected object.

15. The terminal of claim 14, wherein the control unit controls executing, when the hand makes a motion within the viewing angle of the camera unit, a predetermined function in association with the selected object according to the motion.

16. The terminal of claim 14, wherein the sensing unit generates information on at least two hovering areas detected on the display screen and sends to the control unit, and wherein the control unit determines, when a distance between the two hovering areas decreases, that the multi-finger hovering gesture is made.

17. The terminal of claim 14, wherein the display unit changes the size of the selected object selected by the multi-finger hovering gesture.

18. The terminal of claim 14, wherein the display unit decreases or increases the size of the object according to a distance between the display screen and the hand.

19. The terminal of claim 14, wherein the display unit displays the selected object in a full screen mode or a plurality of objects selected according to a user input.

20. The terminal of claim 14, wherein the control unit acquires the image input through the camera unit, separates a hand area from a background area based on color information of the image, recognizes a contour of the hand from the hand area, and recognizes motion and shape of the hand by performing pattern matching onto the hand contour.

21. The terminal of claim 14, wherein the control unit determines whether a second terminal is connected, transmits, when the second terminal is connected, a transfer standby signal, and establishes, when the second terminal is not connected, a communication channel with the second terminal to transmit the transfer standby signal.

22. The terminal of claim 21, wherein the control unit controls receiving, after transmitting the transfer standby signal, a response signal from the second terminal and transmitting the selected object to the second terminal upon receiving the response signal.

23. The terminal of claim 14, wherein the control unit controls transmitting, when a multi-hovering gesture is detected when connected with a second terminal in response to a file transfer request, a response signal to the second terminal in response to the multi-hovering gesture, receiving an object transmitted by the second terminal, and displaying the received object on the display screen.

24. The terminal of claim 23, wherein the control unit determines, when a distance between at least two hovering areas detected on the display screen increases, that a multi-finger hovering gesture responding to the file transfer request is made.

25. The terminal of claim 23, wherein the display unit displays a visual feedback of increasing the size of the object according to received data of the object.

* * * * *